Sept. 1, 1964　　　　F. R. DICKEY, JR　　　　3,147,477
SPEED MEASURING SYSTEM
Filed Dec. 26, 1957　　　　　　　　　　　3 Sheets-Sheet 1

INVENTOR:
FRANK R. DICKEY JR.
BY *Richard V. Lang*
HIS ATTORNEY.

3,147,477
SPEED MEASURING SYSTEM
Frank R. Dickey, Jr., De Witt, N.Y., assignor to General
Electric Company, a corporation of New York
Filed Dec. 26, 1957, Ser. No. 705,419
28 Claims. (Cl. 343—8)

The present invention relates to speed measurement and has as an object thereof to provide a novel system for measuring the relative speed between an observer and an observed body. The present invention depends upon the modification of wave energy, transmitted toward the body under observation, by the reflection process.

The present invention is applicable to the solution of a wide range of speed measurement problems. Since the invention requires no physical contact between the bodies between which relative speed is being measured, the invention is particularly useful in the measurement of the speed of fluid borne or unsupported bodies. The invention thus provides means for the measurement of the true horizontal ground speed of an aircraft or the true speed of a vessel borne upon a body of water. The invention is also advantageous in the measurement of speed in applications where direct contact is difficult or otherwise not desirable. One such application is in the measurement of the speed of railroad cars, or in the measurement of the speed of motion of material on a moving belt. In general, the invention is applicable to the measurement of relative speed in all cases in which the body under observation may be made to subtend an appreciable angle as viewed by the observer in the direction in which speed is being measured. It may further be observed, that the invention is applicable to the measurement of speed in a direction generally transverse to a line connecting the observer and the nearest point of the observed object, as in the above-cited examples. While applicant recognizes that the broad principle of the invention may be employed in the measurement of relative speed along, rather than transverse to, a line connecting the observer and the nearest point of the observed object, applicant has not treated this type of speed measurement in the present application.

The present invention has several distinct advantages in certain of these applications. Perhaps the greatest of these advantages is that the speed determination is unaffected by currents in the medium in which one body is supported. In the case of aircraft speed measurement the air currents may easily exceed 100 miles an hour. In this application, applicant's system is considerably more accurate than a system measuring the aircraft air speed alone. Applicant's system is likewise insensitive to ocean currents, when applied in the measurement of the speed of water borne vessels.

Applicant's invention depends upon the modification of a wave reflected from the body under observation. In the measurement of bodies moving at high speeds, such as aircraft, a radio wave is employed, and the equipment is airborne. With water borne vessels of low speed the equipment is shipborne, and a sound wave of high frequency is employed. As most broadly stated, the invention is related to known Doppler systems since these systems depend upon a change in condition of a wave reflected from the body under observation to determine its relative speed to the observer.

The inventive system, however, not only depends upon Doppler effects which produce frequency shifts in the observed echo returns, but also takes into account changes in amplitude and phase of the reflected wave. The foregoing difference leads to many practical advantages of applicant's system over known Doppler systems and leads to many differences in actual practical execution. In a known Doppler system for aircraft speed measurement, a very narrow radio beam is projected forward of the aircraft at an angle of perhaps 45° to the vertical. The aircraft then captures an echo return and senses the average Doppler-caused frequency shift to obtain an indication of the rate at which the aircraft is approaching the area causing the echo. A trigonometric function of the effective beam angle is used to convert the indicated rate of closure between the aircraft and the area under observation into the desired horizontal speed component. In a Doppler system, the beam must be narrow to achieve accuracy. This requires that a highly directional transmitting antenna be employed, leading to substantial difficulty in making the antenna installation small enough and convenient enough for use in high speed aircraft. Even with a restricted beam width, the foregoing Doppler system contains large errors arising from changes in the reflectivity of the surface under observation. Since the beam employed in the Doppler system must have finite width, the speed measurement is actually taken from a relatively large observed area. If the area under observation is a smooth surface, then the amount of energy reflected from the nearer portions of the smooth surface will produce a stronger echo return, at which the angle of incidence is more favorable to a strong echo return than at the more remote portions in the area under observation, in which portions, the angle of incidence is less favorable to a strong echo return. On the other hand, when the beam falls on irregular shapes, such as trees in a forest, slight changes in the vertical angle make little difference in the average angle of incidence, and more nearly equal weight will be accorded to the near and far portions of the beam. This difference in reflectivity can introduce a substantial error into a Doppler system and greatly reduce its accuracy. In many applications, the required forward projection of wave energy in advance of the aircraft may also be objectionable.

Applicant's system possesses none of the foregoing disadvantages. The transmitting antenna in applicant's system, need not produce a narrow beam of energy, and as a practical matter, it is preferable that the transmitting antenna have a relatively broad beam e.g. an angle of 40°. Thus the antenna can be quite small. In applicant's system, the antenna may be beamed directly beneath the moving aircraft making it more suitable for installation behind a window. Since the area under observation is centered beneath the observer there is no loss of sensitivity with respect to observation made over water nor is appreciable error introduced from changes in the reflectivity. In applicant's system, the forward projection of energy is very small when compared to the foregoing Doppler systems. Applicant's system, in which wave energy is transmitted in a vertical direction, appears to have advantage in terms of the required transmitted power, it appearing that a saving on the order of 10 to 1 may be achieved.

Accordingly, it is another object of the present invention to provide a new and novel system for measuring the speed of relative motion between a first body and a second body in a direction generally transverse to a line joining said bodies, the body under observation subtending an appreciable angle in said transverse direction.

It is a further object of the present invention to provide a new and novel method of measuring the horizontal speed of an aircraft with respect to the earth.

It is a further object of the present invention to provide a novel system for measuring the horizontal speed of motion of a vessel upon or within a body of water.

It is a further object of the present invention to provide a new and novel system for the measurement of relative speed wherein radio wave energy is transmitted toward the body with respect to which relative speed is being measured and wherein modification of the energy by the reflection process is employed in the measurement of the speed.

It is still another object of the present invention to provide a new and novel system of measuring relative speed wherein sound energy is transmitted toward the body with respect to which the relative speed is being observed, and wherein modification of the energy by the reflection process is employed in the measurement of the speed.

These and other objects of the present invention are achieved in a novel relative-speed measuring system incorporating a source of wave energy and two reception devices. In application of the invention to the measurement of aircraft ground speed, the source projects a wide beam of wave energy downward the earth and the two reception devices, placed in a horizontal line generally parallel to the direction in which speed is being measured, capture a succession of echoes from the ground. Applicant has discovered that these echoes contain a large amount of information of the nature of the terrain, represented in the reflected wave by changes in frequency, phase and amplitude, and that the signals derived in both reception devices are very much the same, except that one signal is delayed in time with respect to the other. Accordingly, applicant provides means for the detection of these changes and means for the delay of the first received detected wave until it is in time correspondence with the second received detected wave. Correspondence of the two signals is achieved by subtraction or multiplication of the two signals together and evaluation of the resultant. The quotient of the spatial separation of the two receiving antennas divided by twice the time delay, when correspondence is maximum, is then found to give the aircraft ground speed.

Further aspects of the invention leading to refinements in the foregoing system, reduction in sensitivity to changes in aircraft attitude, and automatic determination of drift and ground speed appear in the following description.

The features of the invention which are believed to be novel are set forth with particularity in the appended claims. The invention itself, however, both as to its organization and method of operation, together with further objects and advantages thereof, may best be understood by reference to the following description when taken in connection with the drawings, wherein:

Figure 1:
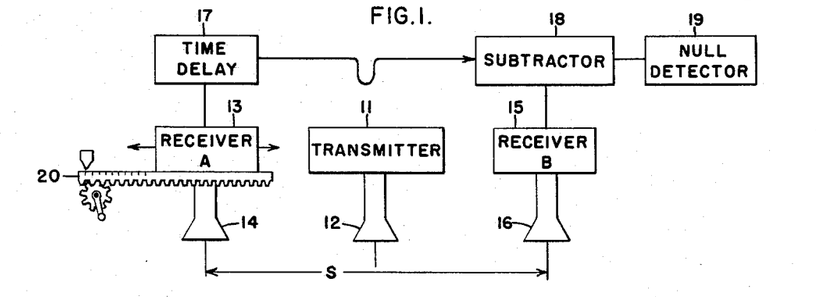
FIGURE 1 schematically illustrates a first embodiment of the invention.

Referring now to FIGURE 1, a first embodiment of applicant's novel ground speed measuring device is shown, with each of its principal components illustrated in a block type representation. They include a transmitter 11, provided with a downwardly directed transmitting antenna 12, a first receiver A, bearing a reference numeral 13, provided with a downwardly directed receiving antenna 14 and a second receiver B, bearing a reference numeral 15, also provided with a downwardly directed receiving antenna 16. The output connections of the receiver 13 are shown coupled through a time delay element 17 to an input connection of a subtractor 18. The output connections of the receiver 15 are connected to another input connection of the subtractor 18. A null detector 19 coupled to the output of the subtractor 18 is used to indicate the magnitude of the remainder. Finally, means 20 are provided for achieving measured translation of the receiver A and its antenna 14 with respect to the receiving antenna 16.

The above equipment may be installed in an aircraft and used to determine the true ground speed of the aircraft. When so installed, the receiving antennas 14 and 16 are oriented either in a line parallel to the axis of the aircraft, or parallel to its direction of motion for reasons to be indicated hereafter, the receiving antenna 14 being forward of the receiving antenna 16. The two receiving antennas should have like angular directivities, and be positioned with their directional axes in parallel alignment. The positioning of the transmitter 11 and its antenna 12 are not particularly critical provided that the transmitting antenna is properly directed downward and relatively decoupled from the receiving antennas.

The equipment functions in the following manner. The transmitter 11 may be a relatively low-power source of microwave signals, typically transmitting at a power of less than a watt at a frequency of 9000 megacycles. It may operate continuously within modulation or may be modulated for reasons to be indicated hereafter. The transmitting antenna 12 may be a relatively short broadbeam horn, typically having a 40° beam width measured at the 3-decibel points, directing waves from the transmitter earthwards. The downwardly-directed receiving antennas 14 and 16 receive echoes of the signals transmitted from the transmitter 11 and feed the signals to the receivers 13 and 15, respectively.

The receivers 13 and 15 are adapted to receive signals over a narrow band of frequencies centered at the frequency of the transmitter. Each receiver contains a detector, typically a single rectifier producing in its output a band of components of varying amplitudes, phases and frequencies lying principally in the range of audible frequencies. As will shortly be explained, in the process of reflection, the wave transmitted from the moving aircraft is converted into a plurality of components having sundry amplitudes and phases and having frequencies scattered about the central transmitted frequency. The receivers function to recover the "modulations" in amplitude, phase and frequency which have occurred.

The detected output of the receiver 13 is then passed through a time delay element 17 to the subtractor 18. The time delay element 17 provides a fixed, equal time delay to signals of all detected frequencies and may typically take the form of a lumped-constant delay network, although other arrangements, such as a magnetic recording-play back device in which play-back is adjusted to occur at an arbitrary time after recording, may also be used.

The subtractor 18 subtracts the time delayed detected signal derived in the receiver 13 from the detected signal derived in the receiver 15 and derives a remainder signal. When the input quantities are most nearly identical, the output of the subtractor approaches zero. The subtractor may take various forms such as a three electrode vacuum tube device, wherein signals derived in one receiver are coupled to the grid, while signals derived in the second receiver are coupled to the cathode. In such a device, the simultaneous application of two voltages of like polarity and magnitude to the grid and cathode tends to produce no change in output plate current flow, since the two electrodes have equal magnitude but opposite polarity control effects. When the input quantities are not identical in all their parameters, then cancellation does not occur and a change in output current occurs. Other known types of subtractors may of course be employed.

The output of the subtractor 18 is fed to a null detector 19 which indicates the point at which subtraction is most nearly complete. The output of the subtractor resulting from the subtraction of two unidirectional voltages, whose magnitudes vary with time, results in a bidirectional or alternating remainder voltage. If amplifying devices intervene between the detectors and subtractor inputs, an alternating output is also produced. For these reasons, the null detector may take the form of an A.C. moving-coil device preferably having appreciable inertia for providing averaging of the output indication.

The receiver translating means 20 provides translation of the receiver 13 in a measured amount along the axis in which speed is being measured. In the simplest form, the translating means 20 may take the form of a hand operated gear train arranged to displace the receiver 13 and its antenna 14 in a measured amount. In a more complicated form, the translating means 20 may be a servomotor operated from the subtractor output if appropriate additional means are provided for scanning the servomotor. It has been observed that by adjustment of the position of the receiving antenna 14, one can obtain a null in the output of the subtractor 18. When a null is so obtained, the quotient of the measured displacement between the receiving antennas 14 and 16 divided by twice the time delay introduced in the output of the receiver 13 has been found to give an accurate measurement of the ground speed of the aircraft.

The principle by which ground speed is measured may now be explained. Let one initially consider a situation in which a moving aircraft is provided with a single receiver, such as the receiver 13, and a suitable source of transmitted waves, such as the transmitter 11. As the aircraft moves over the ground, an examination of the signal return discloses many substantial departures from the original transmitted wave. The original transmitted wave may typically take the form of a constant-amplitude wave of a substantially single, constant frequency. On the other hand, the signal return contains a packet of waves, which while having an average frequency often equal to that of the transmitted wave, do in fact consist of components of diverse amplitude and phases scattered above and below the transmitter frequency. It may further be observed, that if the aircraft retraces its path at the same speed, that the modifications occurring in the signal return are largely duplicated, demonstrating that the modifications are attributable to characteristics of the terrain.

These differences in signal return may be ascribed to differences in reflectivity and configuration of a ground element. The differences in reflectivity affect the amplitude of the reflected components. The differences in configuration of a ground element, whose momentary distance to the receiving antenna affects the relative speed between the object and the antenna, affects both the phase and frequency of the reflected component at the receiving antenna.

One particularly observes shifts in frequency in the packet of waves contained in the signal return. The frequency shifts arise from Doppler effects, a well known effect which produces a maximum frequency increase in the reflected wave when the aircraft is moving at greatest relative speed toward an object, and a maximum frequency decrease in the reflected wave when the aircraft is moving at greatest relative speed away from an object. Thus, the Doppler frequency shifts are greatest with respect to objects near the aircraft's horizon and smallest with respect to objects directly beneath. This last effect may be appreciated by recognizing that in level flight, at the instant that an object is directly beneath an aircraft, the aircraft is neither approaching nor going away from the object and hence has no relative speed toward or away from the object. It may further be observed that if the transmitter antenna produces a relatively broad angular distribution of energy, then an appreciable portion of the transmitted energy will be transmitted well in front of and well behind the aircraft, thus giving rise to a relatively large amount of reflected wave energy at Doppler-shifted frequencies. The speed of the aircraft thus has a dispersive effect upon the signal return, dispersing the signal returns in frequency to correspond with the dispersal of the ground objects in distance. The dispersive effect upon proper detection of the signal return thus makes a large amount of detailed information of the ground terrain separately available in the signal return, in effect producing a detailed electronic description of the terrain.

This electronic description may be further described by considering that, if the aircraft is following a given path at a given speed, then there is produced an ever-changing voltage output from the receiver the instantaneous value of which is solely a function of the nature of the terrain and of the exact position of the aircraft above the terrain. Should the aircraft be caused to retrace the given path at the given speed, then the same sequence of voltage values will be reproduced with precision. It may be observed that a particular value of voltage may be associated with each particular position in the path of the aircraft. Applicant's invention operates in recognition of this fact.

Let us now consider how this electronic description of the terrain beneath the aircraft may be employed to determine the aircraft ground speed. Let us assume that the aircraft is provided by two separate and identical transmitting and receiving systems, one borne at a forward portion of the aircraft and the other borne at an after portion of the aircraft. By being supported upon the same aircraft, let us also assume that the two systems are constrained to traverse the same path, at the same speed. As the aircraft progresses, the fore part of the aircraft will pass over a selected portion of the terrain somewhat in advance of the after portion of the aircraft. Thus each electronic description produced in the first system will be available somewhat later in the second system. If one could determine the time delay between identical descriptions, then one could determine the time it would take the aircraft to cover a distance of ground equal to the distance between the systems. If one then divides the distance between the forward transmitting system and the after transmitting system by this time, then one would be able to determine the ground speed of the aircraft. Applicant applies this basic principle.

In applying this principle, it has been necessary that applicant devise a convenient way of comparing electronic descriptions of the terrain, taken at instants spaced in time. In the embodiment under discussion, the electronic descriptions are recovered by detection of the reflected wave, and the earlier taken description is delayed in time until it is coincident in time with the later taken description. Then the two signals are compared by electrical subtraction. When the earlier taken description is delayed in precisely the correct amount so that it is delivered simultaneously with the later taken description to the subtractor 18, then cancellation will occur and a null will be produced in the subtractor output. In the illustrated embodiment, a fixed electrical time delay is employed, and to achieve a null, the spacing between the receiving systems is adjusted. The aircraft ground speed may be obtained by dividing the spacing between the receiving installations by the time delay.

Figure 2A:
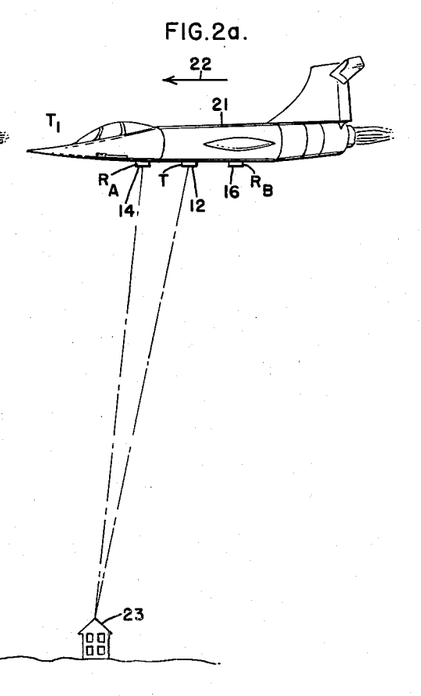
FIGURES 2a and 2b are explanatory illustrations useful in understanding the invention.
Figure 2B:
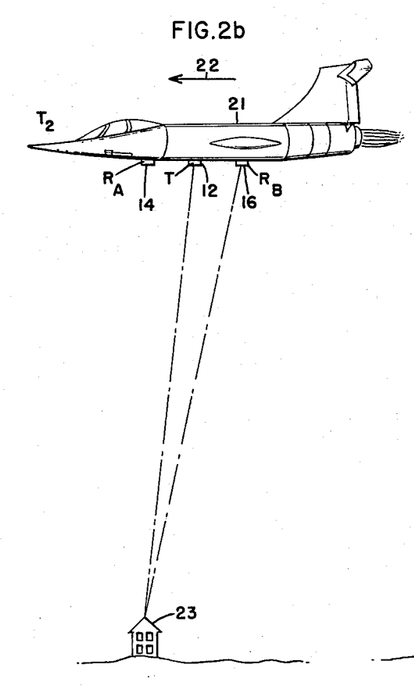

The hypothetical arrangement outlined two paragraphs above contemplated two identical transmitting and receiving systems. Applicant's arrangement employs a single transmitting system with two receiving systems. That only a single transmitting system is required may be intuitively demonstrated by reference to FIGURES 2a and 2b are two side elevator pictures of an aircraft 21 moving from right to left in the illustration at the times $T_1$ and $T_2$ respectively. The times $T_1$ and $T_2$ are selected arbitrarily to permit the transmitting antenna 12 and receiving antenna 14 of FIGURE 2a to become superimposed upon the respective positions of the receiving antenna 14 and transmitting antenna 16. The arrows 22 indicate the direction of motion of the aircraft. FIGURES 2a and 2b show the transmitting antenna 12 and the receiving antennas 14 and 16 of applicant's first embodiment. For simplicity in the foregoing intuitive demonstration, let one assume that the transmitting antenna 12 is equally spaced between the receiving antennas 14 and 16. Let one further assume that a particular point on the terrain bearing a reference numeral 23 has a given reflection characteristic and may be treated independently of all other points.

An interchange of a receiving and a transmitting system in position as indicated in FIGURES 2a and 2b has no effect on the reflected components. At time $T_1$ a signal from the transmitter 11 arriving at the receiver A in consequence of the reflection arising from the point 23, traces out a path down from the transmitting antenna 12 to the point 23 and from the point 23 up to the receiving antenna 14. At time $T_2$ the same path is traced in reverse from transmitting antenna 12 to receiving antenna 16. The amplitude of the reflected signals will be a function of the reflective properties of the element 23. Since reflective properties are reciprocal, the interchange in positions of the transmitter and of the receiver will not change the reflectivity. Since the total path has the same length, regardless of the sequence of measurement, the signals would require the same number of wavelengths to reach the receiving antennas 14 and so would arrive in the same phase and amplitude, independent of an interchange between transmitter and receiver.

The frequencies of the received components are also unaffected by exchanging the positions of the transmitting and receiving systems. A brief consideration shows that the rate of total path length reduction is also independent of the direction of measurement. Since the Doppler frequency shifts are determined by this quantity, they are also independent of the direction of measurement and independent of whether the transmitting antenna and receiving antenna are in the positions illustrated in FIGURE 2a or are mutually exchanged as in FIGURE 2b.

The foregoing discussion intuitively indicates as to any individual point on the ground, that the reflectivity, phase and Doppler frequency shift in the signal return will be independent of whether the transmitter and receiver were mutually exchanged in position or not. The analysis may be extended to all points under observation, thus leading to the conclusion that the same electronic description would be produced in the receiver, regardless of whether it was in a position aft of the transmitter, or mutually exchanged therewith, and in a position forward thereof.

Thus one may observe two closely similar electronic descriptions of the terrain in a system employing only a single transmitter and two receiving systems, and these two descriptions, which are received at different times may be compared, after suitable delay of the earlier received signal, to determine the ground speed of the aircraft.

The foregoing assumptions made to facilitate intuitive analysis are considerably more restrictive than necessary in practical cases. It appears, in particular, that the transmitter need not be equally spaced between the receivers A and B, nor need it be in the same path or in line with receivers A and B. The horizontal dimensions which have been indicated have in general been exaggerated for purposes of clarity. In a practical installation for use in a small aircraft, both receiving antennas are confined within an opening of less than 6 by 12 inches and the transmitting antenna is placed at a more remote part of the aircraft. Assuming that the aircraft is traveling slightly over 100 miles an hour, the actual separation between the two receiving antennas need only be on the order of 11 centimeters assuming a time delay of 1.188 milliseconds. In an aircraft operating at a speed on the order of 100 miles an hour, and employing the illustrated parameters, the observed frequency shifts were principally confined to a band below 1000 cycles. The delay element 17 was thus chosen for its ability to provide an equal delay to signals lying over this band. Should a similar installation be made in a higher speed aircraft, then higher frequency components might be expected, substantially in proportion to the speed involved, assuming the same transmitter frequency. Assuming an aircraft speed of 1000 miles an hour, the maximum frequency shifts would be on the order of 10,000 cycles.

The initially considered embodiment has been shown as an illustrative arrangement for practicing the invention. Other arrangements of equal simplicity may be employed. Instead of employing adjustment of the spacing between receiving antennas for determining the ground speed in conjunction with a fixed delay element one may employ a fixed spacing between antennas, and employ a variable time delay element. A suitable variable time delay element may take the form of a magnetic recorder-delayed play back device (as suggested earlier) wherein the speed of advance of the recording medium or the distance between the recorder and play back head is varied. One may also prefer to employ a multiplier, instead of the illustrated subtractor 18, in which case, signal return coincidence occasions a maximum output indication.

Figure 3:
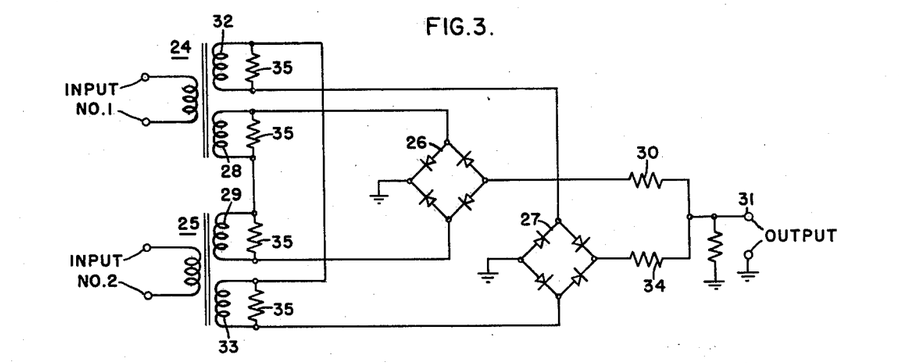
FIGURE 3 is a circuit diagram of a component of applicant's system, whose specific function is for the multiplying of two electrical waves in determining correlation.

A suitable multiplier for such use is illustrated in FIGURE 3. It comprises a pair of identical transformers 24 and 25, respectively, each having single primary windings, and two identical secondary windings, a pair of full wave bridge rectifiers 26 and 27, and several resistances. The drawing illustrates the sense in which connections are made. A first secondary 28 of the transformer 24 is connected in series in the same sense with a first secondary 29 of the transformer 25 between the A.C. input connections on the rectifier 26. The positive output terminal of the rectifier 26 is grounded while the negative output terminal is coupled through a resistance 30 to the ungrounded output terminal 31. A second secondary 32 of the first transformer is connected in series in opposite sense with a second secondary 33 of the second transformer 25 between the A.C. input connections on the rectifier 27. The negative output connection of the rectifier 27 is grounded, and the positive output connection is coupled through a resistance 34 to the ungrounded output terminal 31. In addition, like-valued resistances 35 are connected in shunt with each of the transformer secondaries, and a further resistance 36 is provided, shunting the output terminal 31 to ground.

The multiplier achieves multiplication in the following manner. Assuming a voltage $e_1$ to be applied to the input of transformer 24 and a voltage $e_2$ to be applied to the input of transformer 25, the rectifier 26 functioning on a square law produces a voltage:

$$(e_1+e_2)^2$$

since the windings connected thereto are in adding sense. Similarly the voltage output of the rectifier 27, in which the voltages oppose is:

$$(e_1-e_2)^2$$

By the inversion of the output connections from the rectifiers, the voltage outputs of the rectifiers are inverted at the point of combination, producing an output voltage, $e_0$:

$$e_0=(e_1+e_2)^2-(e_1-e_2)^2$$
$$=2e_1e_2$$

which contains the required product as a factor. The resistances 35 may be 43,000 ohms, the resistances 30 and 34 200,000 ohms, and the resistor 36 20,000 ohms. The rectifiers may be 1N63 type rectifiers.

The initially considered embodiment employs a simple linear rectifier. While this type of detection is simplest in theory of operation and does have certain operational advantages, its use necessitates considerable care in the overall installation to achieve accuracy. A first precaution is to avoid direct transmitter leakage into the receiving antenans. The simple detector, it may be recalled, is ordinarily insensitive to phase frequency changes of the carrier. The simple detector produces in its output, a detected voltage, conforming to the carrier envelope and containing primary information based upon the amplitude of the carrier waves. When feed-through occurs, the waves directly supplied from the transmitter, however, upon arriving at the individual receiving antennas combine with the echo returns to produce low-frequency heterodyne components in the detector output. The magnitudes of the heterodyne components are dependent upon the mutual phase relationship between the signal returns and the transmitter feed-through, thus making the detector phase-sensitive. It is extremely difficult to provide simultaneous compensation in both receiving systems for the effect of stray feed-through.

Two methods have been proposed for avoiding feed-through. One is the use of careful isolation between the transmitting and the receiving systems as by placing the aircraft body between the receiving and transmitting systems. A second method is to disable the transmitter so that at the moment of reception no transmission occurs, while disabling the receiver during the periods of transmission. Since the aircraft will operate through a relatively large range of altitudes, it is necessary to select a pulsing rate which will be satisfactory for the corresponding range of time delays to be encountered in the signal return.

The selection of a detector also has a bearing upon the manner in which the ground speed measuring device functions when the axis of the receiving antennas is not parallel with the true horizontal course line of the aircraft. Skewing of these axes occurs from changes in attitude of the aircraft and from drift and has two principal effects upon the system. One of the two effects is relatively independent of the type of detector employed. Assuming that the axis of the receiving antennas and aircraft axis are parallel, this effect appears as an error in the measured speed determination by a factor $(1-\cos \theta)$, where $\theta$ is the angle that the aircraft attitude or heading makes with a true horizontal course line. It may be explained by recognizing that the receiving antenna separation which is used as a measure of the aircraft speed, must be measured along the true horizontal course line. In practice, it is generally preferable to maintain the axis of the receiving antennas on the same bearing as the true course line, rather than to rely upon a subsequent correction of the reading. With respect to errors in attitude which are usually smaller, electrical correction with respect to a known vertical, rather than stabilization of its antenna platform is usually preferred.

The other effect of skewing between the antenna axis and horizontal course line is in accuracy of correlation. When skewing occurs, the two receiving antennas no longer trace out precisely the same paths in space. If skewing occurs in a vertical plane as by a change in attitude, then the phase of the signal returns arriving at the receiving antennas will no longer be precisely equal and will change relatively rapidly. The corresponding amplitudes do not change so rapidly and will remain relatively equal. When a linear detector is employed, the changes in phase have very little effect upon the detected amplitudes, and the correlaiton is not interfered with. If a synchronous detector is employed, which is a phase sensitive device, then a rather serious error is introduced. Elevation of one receiving antenna relative to the other by one quarter wavelength destroys correlation and elevation by one half wavelength, will invert the phase of the wave for one detector and tend to provide correlation at an improper antenna spacing.

Skewing in a horizontal plane on the other hand, causes a change in the components selected and has equally adverse effects on both types of detectors. The correlation retained after a change in heading is a function of the percentage correspondence between the paths swept out by the two receiving antenna horns. Assuming that the horn opening dimensions are on the order of two wavelengths, a misalignment in path of ¼ wavelength will still not prevent the two antennas from sweeping out 87.5% of the same path and preserving a useable indication of correlation. The sensitivity of the correlation to changes in heading may typically be only ⅕ to ¹⁄₁₀ as much as with respect to changes in attitude when synchronous detection is used. If the antenna openings are larger, changes in heading have less effect upon the correlation and if the antennas are more closely spaced, the magnitude of the worsening of correlation is likewise reduced for a given angular departure between the antenna axes and the true horizontal course line.

The simple linear rectifier in arrangements, where transmitter feed-through is eliminated, thus has the advantage of less sensitivity to changes in aircraft attitude than the synchronous detector. However, in environments where feed-through can not be avoided, an arrangement using synchronous detection, and using controlled rather than stray feed-through, provides the more satisfactory solution. This is particularly true if means can be provided for correcting agianst the attitude sensitivity of this type of detector.

Figure 4:
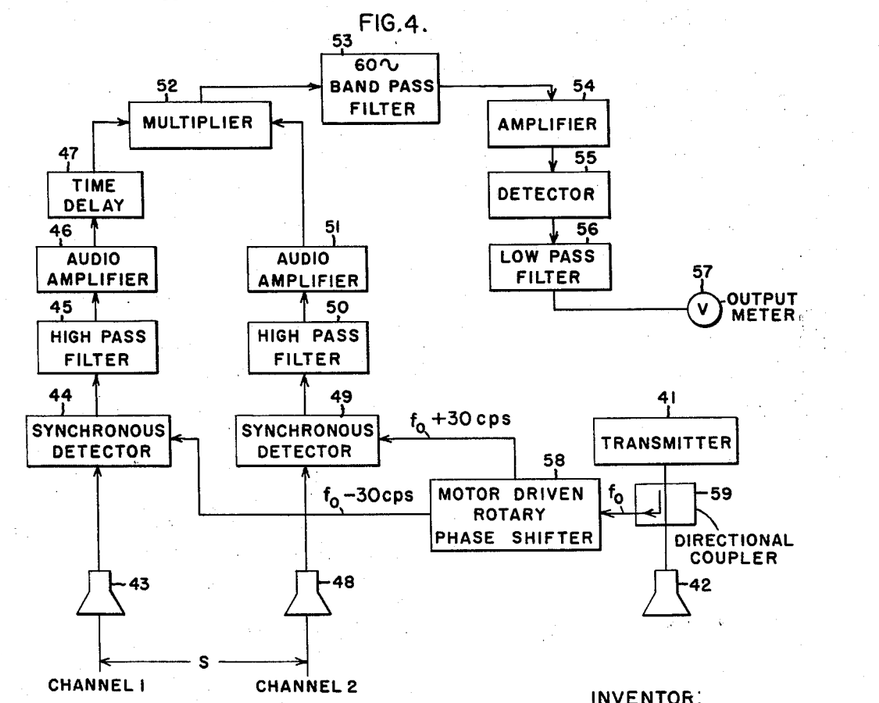
FIGURE 4 schematically illustrates a second embodiment of the invention wherein means are introduced for improving correlation in the face of changes in attitude of a vehicle in which the system is installed.

FIGURE 4 illustrates a ground speed measuring arrangement in which synchronous detectors are employed and includes means for correcting against the phase sensitivity referred to above. The arrangement illustrated in FIGURE 4 includes a transmitter 41 having a transmitting antenna 42 and two receiving channels. The first receiving channel includes a first antenna 43 coupled to a synchronous detector 44. The output from the synchronous detector 44 is fed through a high pass filter 45 to an audio amplifier 46 and thence to a time delay element 47. The second receiving channel includes a second receiving antenna 48, a second synchronous detector 49 whose output is fed through a high pass filter 50 to an audio amplifier 51. The high pass filters 45 and 50 may have a low-frequency cut-off of 200 cycles per second. The respective outputs of the time delay 47 in the first receiving channel and of the audio amplifier 51 in the second receiving channel are applied to the two input terminals of the multiplier 52 which may take the form illustrated in FIGURE 3. The output of the multiplier 52 is fed through a 60-cycle bandpass filter 53 to a further amplifier 54. The output of the amplifier 54 is then coupled to the detector 55 whose output is in turn coupled through a low pass filter 56 to an output meter 57. The synchronous detector 44 and the synchronous detector 49 for derivation of their synchronizing voltages are connected with two output terminals of a rotary phase shifter 58 whose output is derived through a directional coupler 59 from the transmitter 41. The motor-driven phase shifter provides a decrease in reference frequency supplied to the output terminal coupled to detector 44 by thirty cycles per second while providing an increase in frequency, supplied to its other output terminal, by an equal amount.

The rotary phase shifter 58 may take the form of two rotary phase shifters, driven in opposite directions at the same speed at a rate to provide a 30-cycle-per-second frequency shift. A suitable rotary phase shifter has been described in the Proceedings of the I.R.E. number 12, volume 35 of December 1947 in an article by A. G. Fox entitled "An Adjustable Waveguide Phase Changer."

The arrangement shown in FIGURE 4 functions to measure speed in a manner generally similar to the arrangement shown in FIGURE 1. The receiving antennas 43 and 48 are adjustably positioned as before to achieve correlation. Their half spacing, when divided by the time delay provided in the delay line element 47 is used to determine the ground speed of the aircraft.

The arrangement shown in FIGURE 4 employs synchronous detection and is accordingly considerably different in detailed execution and functioning from the previous embodiment. Considering now the first channel, the signal return is supplied to the synchronous detector 44, whose synchronizing signal is a signal at a frequency 30 cycles below the transmitter frequency. The synchronous detector thus produces in its output a low frequency signal which may be treated as a wave representing the ground return, having all of its components increased in frequency by 30 cycles per second. The high pass filter 45 then filters out the low frequency components below 200 cycles, and transmits the remaining waves containing higher frequency components through the delay element 47 to one input terminal of the multiplier 52. The output voltage of channel 2 represents the signal return captured by antenna 48 after synchronous detection against a synchronizing wave whose frequency is elevated 30 cycles per second above the carrier frequency, and the modification of the detected wave by passage through a high pass filter whose low frequency cut off is approximately 200 cycles per second. The high pass filter effectively eliminates the final bit of interference caused by transmitter leakage to the receiving antennas. Since the detected components caused by such leakage are principally near 30 cycles per second, and thus quite low in frequency, they may be eliminated by the low pass filter, set at 200 cycles. The output voltage of channel 2 may be treated as a wave representing the ground return and having all of its components reduced in frequency by 30 cycles per second. In the multiplier 52, the two detected waves derived from the channels 1 and 2, formed of components having 60 cycles per second frequency differences are multiplied together to produce as a useful component, a 60 cycle wave, whose average amplitude is a measure of the correlation. This component is selected to the exclusion of all others by the bandpass filter 53, and after amplification in the amplifier 54, its amplitude is detected in the rectifier 55 and passed through a low pass filter 56 to an output indicator. The function of the low pass filter 56 is to prevent erratic changes in the correlation voltage so derived and thus to stabilize the output indication.

The foregoing explanation has omitted a discussion of the considerations dictating the use of waves of dissimilar frequencies for supplying the synchronous detectors 44 and 49. The purpose of this choice is to prevent an erroneous indication of correlation that may occur when the signal return supplied to antenna 1 is slightly out of phase with the signal return supplied to antenna 2. This out of phase condition can be caused by changes in attitude of the aircraft when a phase-sensitive type of detector such as a synchronous detector is employed. The echo return arriving at channel 1 may be treated as formed of a wave expressable in the following generalized manner:

$$a_1(t) \cos(wt) + b_1(t) \sin(wt) \quad (1)$$

where $a_1$ and $b_1$ are functions of the exact position of the antennas relative to the terrain and hence, because the aircraft is in motion, are functions of time as indicated. The reference voltage supplied to the detector 44 may be assumed to be as follows:

$$\cos(wt) \quad (2)$$

With such a synchronizing voltage applied, the synchronous detector produces an output voltage from the above echo return as follows:

$$a_1(t) \quad (3)$$

thereby effectively recovering the amplitude coefficient of the first term of expression (1) and completely suppressing the second term of expression (1). In similar manner, assuming level flight, one may treat the echo return arriving at channel 2 as having components expressable as follows:

$$a_2(t) \cos(wt) + b_2(t) \sin(wt) \quad (4)$$

Assuming a reference voltage as before, the detected output would be:

$$a_2(t) \quad (5)$$

Since the quantity $a_1(t)$ is delayed in time in the delay line 47, it may be represented as $a_1(t-\tau)$, where $\tau$ is the amount of the time delay, when it is applied to one input of the multiplier 50. The product derived in the multiplier 50 may be represented as:

$$a_1(t-\tau) a_2(t) \quad (6)$$

The correlation function $\rho(\tau)$ may now be defined as the time average of expression (6):

$$\rho(\tau) = \overline{a_1(t-\tau) a_2(t)}^t \quad (7)$$

Statistically, it may be shown that the time average of the product of the "$b$" terms is equal to the same quantity:

$$\rho(\tau) = \overline{b_1(t-\tau) b_2(t)}^t \quad (8)$$

It can be shown that if $w$ is properly chosen, i.e. such that it is equal to the average frequency of the components received, then the time average of the cross terms are identically equal to 0:

$$\overline{a_1(t-\tau) b_2(t)}^t = 0$$

$$\overline{b_1(t-\tau) a_2(t)}^t = 0 \quad (9)$$

The foregoing description has so far treated the echo returns as being in phase. Let us now consider the effect upon the system of a change in attitude in the aircraft which introduces a change in the phase of the echo return supplied to channel 2. The echo return may now be expressed as:

$$a_2(t) \cos(wt+\phi) + b_2(t) \sin(wt+\phi) \quad (10)$$

where $\theta$ is the change in phase occasioned by the change in attitude of the aircraft. It may be observed that the change in attitude is treated as having no effect upon the amplitude terms $a_2(t)$ and $b_2(t)$ but merely occasions a change in phase of the respective components. Experience has shown this to be true. This modified signal produces in the output of the synchronous detector 49, assuming that it is supplied with a wave of the same phase as before, the following detected voltage:

$$a_2(t) \cos(\phi) + b_2(t) \sin(\phi) \quad (11)$$

The quantity 11 is then multiplied in the multiplier with the quantity $a_1(t-\tau)$ to produce:

$$a_1(t-\tau)[a_2(t) \cos(\phi) + b_2(t) \sin(\phi)] \quad (12)$$

which may be re-expressed $$a_1(t-\tau) a_2(t) \cos(\phi) + a_1(t-\tau) b_2(t) \sin(\phi) \quad (13)$$

If a time average of expression (13) is taken, the second term of the expression (13) becomes 0, and a time average of the multiplied quantities in the first term simplifies to:

$$\overline{a_1(t-\tau) a_2(t) \cos(\phi)}^t = \rho(\tau) \cos(\phi) \quad (14)$$

Since the quantity $\rho(\tau)$ is the quantity sought, it may be seen that the output of the multiplier 52 now provides an incorrect indication of that quantity, the quantity $\rho(\tau)$ being multiplied by $\cos(\phi)$.

If we wish to eliminate the error introduced by the $\cos(\phi)$ factor, one may rotate the angle $\phi$ in time, whereby the quantity $\rho(\tau)$, as it appears in expression (14) will then become an amplitude term of an alternating wave whose periodicity is determined by the rate at which the phase is rotated. The arrangement shown in FIGURE 4 performs this function. Considering now the output of detector 44 which is supplied by a synchronizing wave $(f_0-30)$ cycles per second, one output component may be expressed as follows:

$$a_1(t) \cos 60\pi t + b_1(t) \sin 60\pi t \quad (15)$$

After delay in the time delay element 47, the voltage applied to the input of the multiplier 52 from channel 1 becomes:

$$a_1(t-\tau) \cos 60\pi(t-\tau)$$
$$+ b_1(t-\tau) \sin 60\pi(t-\tau) \quad (16)$$

In channel 2, the echo return takes the form expressed in expression (10). Accordingly, at the output of the synchronous detector 49 we have the following quantity:

$$a_2(t) \cos(\phi-60\pi t)+b_2(t) \sin(\phi-60\pi t) \quad (17)$$

The multiplier 52 then multiplies these quantities and the bandpass filter 53 selects only those quantities having a periodicity of 60 cycles. As before, the cross terms (*ab* terms) disappear and the selected component in the output of the multiplier 52 is accordingly:

$$\tfrac{1}{2}a_1(t-\tau)a_2(t) \cos(\phi-120\pi t+60\pi\tau)$$
$$+\tfrac{1}{2}b_1(t-\tau)b_2(t) \cos(\phi-120\pi t+60\pi\tau) \quad (18)$$

Upon detection, the 60 cycle wave yields the foregoing amplitude term:

$$\tfrac{1}{2}a_1(t-\tau)a_2(t)+\tfrac{1}{2}b_1(t-\tau)b_2(t) \quad (19)$$

which upon time averaging, becomes identically the correlation function $\rho(\tau)$.

Thus it has been shown that by the measures of FIGURE 4, including resort to synchronizing waves whose frequencies lie above and below the transmitted frequency, that the correlation function $\rho(\tau)$ may be recovered in a system employing phase-sensitive detectors, and this without regard to changes in phase between the signal returns, such as arise from changes in aircraft attitude.

Figure 5:
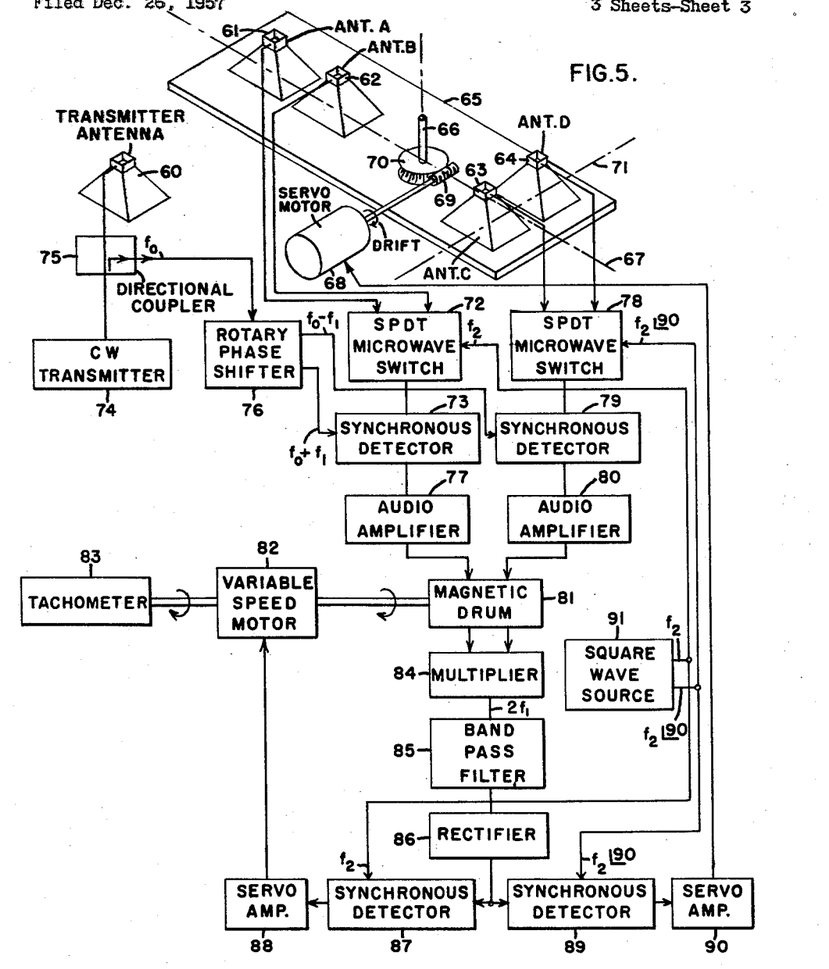
FIGURE 5 schematically illustrates a third embodiment of the invention particularly suitable for aircraft installation providing automatic indication of both ground speed and the angle of drift.

A ground speed measuring system providing automatic drift indication and an automatic speed indication is illustrated in FIGURE 5. The ground speed measuring system is provided with a transmitting antenna 60 and four receiving antennas 61, 62, 63 and 64, all four of which are supported upon a rotatable platform 65 placed at some distance from the transmitting antenna 60. The rotatable platform 65 is supported upon a vertically extending shaft 66 which is provided with additional bearings (not shown) to permit rotation of the platform 65 in a generally horizontal plane. The shaft 66 may be used for drift indication as well. The longitudinal axis of the antenna platform is indicated by the center line 67 provided with an arrow pointing in the general direction of aircraft flight. Rotation of the platform 65 about the vertical axis is provided by means of a controlled servo motor 68 mechanically coupled to a worm gear 69, which engages a ring gear 70 non-rotatably attached to the antenna platform 65.

The receiving antennas are supported upon the platform 65 in the following manner. The antennas 61 and 62 are arranged on the after portion of the platform 65 in line with the axis 67, the antenna 61 being slightly aft of the antenna 62. The antennas 63 and 64, are arranged on the forward portion of the platform 65 and are aligned along an axis 71, drawn perpendicular to the axis 67. The antenas 63 and 64 are equally spaced laterally of the intersection between axes 67 and 71.

The antennas 61 and 62 form the counterpart of the antenna 43 of the embodiment shown in FIGURE 4. The antennas 63 and 64 form the counterpart of the antenna 48 of the embodiment shown in FIGURE 4. Thus it will be shown that the effective separation between the antennas, which is used in the calculation of the speed, is the distance between a point midway between antennas 61 and 62, and a point midway between antennas 63 and 64. Since the mutual separations of the receiving antennas are fixed, the actual speed measurement in this third embodiment occurs by adjustment of the difference in time delay between the echo returns. The purpose in providing the antenna pair 61 and 62 is to provide means for sensing error direction in the servo system indicating ground speed and the purpose for providing antenna pair 63 and 64 is for sensing error direction in the servo system indicating and correcting for drift. The manner in which these functions are performed and the equipment incidental to such performance may now be treated.

The electrical circuitry associated with the receiving antennas 61 and 62 may be initially considered. The output of the antennas 61 and 62 are coupled to two terminals of the single-pole double-throw microwave switch 72. This switch may take the form of a mechanical microwave switch or may be an electronic device whose switching condition may be electrically controlled. The output or pole of the microwave switch is then connected to a synchronous detector 73.

As illustrated in the previous embodiment, the voltage supplied to the synchronous detector 73 is derived from the transmitter, but shifted in frequency from the transmitter frequency. The transmitter is shown at 74 having its output coupled through a directional coupler 75 to the transmitting antenna 60. The directional output of the directional coupler 75 is coupled to a rotary phase shifter 76 which produces at its output terminals two signals; one shifted in frequency ($f_1$) above the transmitter frequency ($f_0$), and the other shifted in frequency ($f_1$) below the transmitter frequency. The former wave ($f_0+f_1$) is supplied to the detector 73. The output of the synchronous detector in the form of a detected ground return is fed to an audio amplifier 77, preferably containing a high pass filter for elimination of lower frequency (near $f_1$) components in the detected ground return.

The antennas 63 and 64 have the following electrical output connections. The antennas 63 and 64 are coupled respectively to the terminals of a second single-pole double-throw microwave switch 78. The switch is of the same type as the microwave switch 72 and is also adapted for voltage controlled operation. The output pole of the microwave switch 78 is connected to the synchronous detector 79, which is supplied with a synchronizing voltage ($f_0-f_1$) slightly below transmitter frequency from rotary phase shifter 76. The synchronous detector 79, thus alternately detects the signal return from the antennas 63 and 64, dependent upon the condition of the microwave switch 78. The detected voltage is fed to the audio amplifier 80, which preferably contains a high pass filter for eliminating the lower frequency components in the detected output of the detector 79.

A variable time delay difference between the signals derived in the channel terminating in amplifier 77 and those derived in the channel terminating in amplifier 80 is provided by the magnetic drum 81. The magnetic drum is driven by a variable speed motor 82, mechanically coupled to the drum 81 and to a tachometer or other speed indicating instrument 83. The instrument 83 should of course be calibrated in desired terms of miles per hour or the like.

The magnetic drum is provided by a pair of recording heads, and a pair of play-back heads, arranged upon the drum so that the angular separation between a first recording head and a first play-back head is different from the angular separation between the second recording head and the second play-back head. It may be observed that the difference in delay times in the two paths is thus diminished as the rate of rotation of the drum is increased, and is in fact inversely proportional thereto.

The output signal returns from the amplifiers 77 and 80 are thus coupled for variable delay to the respective input recording heads of the magnetic drum 81. Corresponding playback heads upon the magnetic drum 81 supply these signal returns, after predetermined different delays, to separate inputs of the multiplier 84. The multiplier 84 multiplies the respective signal returns derived in the amplifiers 77 and 80 together. As was true with the embodiment illustrated in FIGURE 4, the product terms, which contain the correlation voltages, appear at a frequency ($2f_1$) and are selected by the bandpass filter 85 tuned to ($2f_1$), coupled to the multiplier output. The correlation voltages themselves, appearing as amplitudes of the wave of frequency ($2f_1$) are then recovered by the rectifier 86, coupled to the bandpass filter 85.

The nature of the correlation voltages available at the output of the rectifier 86 and the circuitry required for their subsequent handling may now be considered. As indicated above, the rectifier output contains a sequence of correlation voltages derived from the multiplication together of the signal returns in the two channels. One channel contains two signal returns derived alternately from one of the antennas 61 and 62, and in the other channel contains two signal returns derived alternately from one of the antennas 63 and 64.

Let us consider the effect of switching antennas 61 and 62. The after antennas 61 and 62 which feed the first channel are aligned along the axis 67 of the antenna platform. Thus the distances which are used in the determination of aircraft speed differ, depending upon whether antenna 61 or 62 is switched into circuit. During the period that antenna 61 is switched into circuit, the effective antenna spacing is equal to the distance from the center of antenna 61 to the centerline 71 of the forward antenna pair. During the period that the antenna 62 is switched into circuit, the effective antenna spacing is equal to the distance between the center of antenna 62 and the centerline 72. Any switching of forward antennas 63 and 64 will not change the effective spacing, since they are equidistant from each of antennas 61 and 62.

When an appropriate time delay is obtained, and equal correlation voltages are derived whether antenna 61 or 62 is connected, then the effective antenna spacing is measured from midway between antennas 61 and 62 and the centerline 71. In proof of this, let us assume that the magnetic drum 81 produces an equal delay to the outputs of antennas 61 and 62, which it does, and that the delay may be adjusted as we desire. Two correlation voltages will be successively obtained from the multiplier 84. The magnitude of one correlation voltage will indicate how nearly the spacing measured to antenna 61 provides correct correlation at a given delay and the magnitude of the other correlation voltage will indicate how nearly the spacing measured to antenna 62 provides correct correlation at the same delay. Since the correlation function is essentially symmetrical, i.e. spacings which are too large or too small by the same quantity, provide equal magnitude correlation voltages, one may determine the correct correlation spacing by adjusting the time delay such that equal correlation voltages occur whether antenna 61 or antenna 62 is connected. When the delay is so adjusted, neither antenna 61 nor antenna 62 is precisely at a perfectly correlated distance, but both are equally offset, above and below, this correlation distance. Accordingly, the proper correlation distance may be measured from midway between antennas 61 and 62 to the centerline of the forward antennas 63 and 64.

Applicant's system uses the different correlation voltages obtained by switching from antenna 61 to 62, and vice versa to automatically seek out the optimum time delay and thus provides an automatic indication of ground speed. The ground speed indicating system is a zero-seeking servo system whose loop includes the variable speed motor 82, the magnetic drum 81, the multiplier 84, the bandpass filter 85, the rectifier 86, all previously discussed, as well as a synchronous detector 87, and a servo amplifier 88, not previously identified. The synchronous detector 87 is coupled to the output of the rectifier 86 and supplies its detected output to the servo amplifier 88. The output of a synchronous detector is a voltage whose magnitude and polarity are respectively expressive of the amplitude of the input wave and its phase relationship to the synchronizing voltage. This phase sensitivity, as it will be shown, gives direction to the detected error, and lets applicant's servo system automatically seek the correct time delay. The output voltage of the synchronous detector 88 is amplified in the servo amplifier 88, suitably filtered, and applied to the speed control of variable speed motor 82 to control its speed.

The servo loop functions in the following manner: Assume for the moment that the antennas 61 and 62 are being switched at the rate $f_2$, a frequency of a few cycles per second. Assume also that highest correlation voltage is momentarily more nearly achieved by the signal return from antenna 62 than the signal return from antenna 61, at a momentary rate of drum rotation. These conditions produce a voltage at the output of rectifier 86, which might be considered as a carrier wave consisting of a first pulse of half cycles of 60 cycles per second periodicity, and having a first amplitude, followed by a second pulse of half cycles of 60 cycles per second periodicity having a second amplitude. If this wave is applied to the synchronous detector 88, whose frequency is now assumed to be controlled by a source of frequency $f_2$, phased to provide a positive cycle when connection is made to antenna 62, then the detector 87 will recover the amplitude of the $f_2$ component only. This component has a magnitude proportional to the difference in amplitudes between the pulses attributed to antenna 62 and those attributed to antenna 61, and the sign of the voltage is positive. This positive voltage is amplified and filtered in the servo amplifier 88 and used to decrease the speed of the motor 82. Decreasing the speed of the motor 82 tends to increase the time delay, thus making correlation occur at a larger spacing. The foregoing increase in time delay tends to reduce the correlation with antenna 62 and to increase it with antenna 61. When a point is reach at which the correlation voltages whether derived from antenna 61 or 62 are equal, then the magnitudes of the pulse terms become equal, and the detected component of frequency $f_2$ becomes zero. When the magnitude of the correction voltage becomes zero, no signal is transmitted to the variable speed control, and the motor speed is held constant. From the foregoing, it may be observed that the motor speed control may take the form of a reversible motor-driven device, tending to come to rest at any of a wide range of speed settings, and adapted to move to a higher speed setting under the influence of a negative voltage while tending to move to a lower speed setting under the influence of a positive voltage.

Automatic drift correction occurs in a similar fashion to the automatic speed indication. This portion of applicant's system is a zero-seeking servo system whose loop includes the antennas 63 and 64, the antenna rotating servo motor 68, the single-pole double-throw switch 78, the synchronous detector 79, the audio amplifier 80, the magnetic drum 81, the multiplier 84, the bandpass filter 85, the rectifier 86, all described previously, and the synchronous detector 89, coupled (jointly with the detector 87) to the output of rectifier 86, and the servo amplifier 90. The servo amplifier 80 couples the output of the synchronous detector 89, after appropriate amplification and filtering, to the servo motor 68. As before, it may be noted that if the antennas 63 and 64 are alternately switched in synchronism with the synchronizing voltage fed to synchronous detector 89, then a voltage indication will appear in the output of the synchronous detector 89, indicative of the difference in amplitude of the correlation functions derived in switching between antennas 63 and 64, and also indicative of which antenna is momentarily in best correlation position with respect to the after antenna pair 61 and 62. The servo system will then go into operation, rotating the antenna platform until both antennas 63 and 64 are equally spaced to one side and to the other of optimum correlation position. The antenna axis 67, which passes through the centers of after antennas 61 and 62 and a point midway between antennas 63 and 64, will seek optimum correlation, i.e. a direction in which the same electronic picture passes parallel to the antenna axis. In this manner the antenna platform seeks the true course line of the aircraft.

The foregoing discussion has treated the speed indicating servo systems and the drift indicating servo systems as not interacting. Isolation may be achieved, as illustrated in FIGURE 5, by resort to a square wave source 91 having outputs phased 90° with respect to one another as a timing source. The initial phase ($f_2$) may then be used to control the speed sensing synchronous detector 87 and the speed checking microwave switch 72, while the secondary phase ($f_2$⌐90), shifted ninety degrees from the first, may be used to control the drift sensing synchronous detector 89 and the drift checking microwave switch 78. The 90° phase relation of the error voltages prevents interaction in the error sensing portions of the servo loop since both synchronous detectors are insensitive to waves 90° out of phase. The respective corrective actions are substantially independent, since a change in delay has no differential effect between drift sensing antennas 63 and 64, and lateral rotation of the antennas for a few degrees has no appreciable effect on their effective spatial separations.

The foregoing system may typically employ as a carrier frequency, a wave developed in a klystron oscillator of a fraction of a watt at a typical frequency of 9000 megacycles. The frequency ($f_1$) may take a convenient value of 60 cycles per second, although it may be larger or smaller. The frequency ($f_2$) may take a convenient value of 2 cycles per second, although slightly more rapid response rates may dictate a higher frequency.

The arrangement illustrated in FIGURE 5 may of course be modified in many respects without departing from the invention. Physically, it may be preferable to mount all of the high frequency components, particularly elements 76, 72, 73, 78 and 79 upon the rotatable antenna platform 65 to avoid the necessity for large numbers of rotatable microwave joints.

This relative rotation of the forward antenna elements 63 and 64 relative to the after antenna elements 61 and 62 may be achieved by other arrangements, such as by retaining the antennas 61 and 62 fixed, and providing lateral translation of the antennas 63 and 64. The manner of achieving relative translation illustrated in FIGURE 5, is perhaps the simplest, since the drift is directly indicated by the position of the shaft 66 and true speed is indicated by the rate of rotation of the magnetic drum 81. When the translation is achieved by direct offset of the forward antennas, then the amount of offset and the rate of drum rotation must be analyzed to produce an indication of drift and an indication of speed.

Another method of achieving both drift error sensing and speed error sensing is by means of a stationary and a rotating antenna, rotated at a fixed rate, such as 2 cycles per second. The system could be installed on the platform 65 shown in FIGURE 5, and would eliminate the need for the microwave switches 72 and 78.

The synchronous detectors 87 and 89 may take several forms, including both purely electronic devices as well as mechanically operated switching devices.

The foregoing discussion has particularly stressed applications of the invention to aircraft ground speed measurement. It should be appreciated that the invention is also applicable to the measurement of the speed of moving bodies, with the measuring device itself stationary. For example, the invention could be used to measure the rate of speed of a railway train passing the observer. The foregoing is true, since applicant's system provides an indication of relative speed.

While specific embodiments so far discussed, have employed radio waves, the invention, in one of its aspects, may also be applied to a system employing sound waves. Such a system may be used in the measurement of the speed of slower moving devices, as in the measurement of speed of a surface ship or submarine. A system employing sound waves may take the form illustrated in FIGURE 1, with the receiving and transmitting devices being devices for the reception and transmission of sound, and the remaining elements shown in FIGURE 1 taking the form of conventional electronic devices. In this utilization of the invention, the transmitter projects sound waves to the bottom of the body of water on which the vessel is operating, and the receivers having sonic pickup devices beamed downwards may be arranged to receive the echoes and thus derive electronic descriptions of the earth's bottom, which may be superimposed as described in the previous discussion of FIGURE 1. In order that adequate sensitivity to motion be achieved, it is of course desirable that relatively high audible or above audible frequencies be used.

While particular embodiments of the invention have been shown and described, it should be understood that the invention is not limited thereto and it is intended in the appended claims to claim all such variations as fall in the true spirit of the present invention.

What is claimed as new and sought to be protected by Letters Patent of the United States is:

1. In a system for measuring the speed of relative motion between a first body and a second body in a direction generally transverse to a line joining said bodies, said first body subtending an appreciable angle in said transverse direction, the combination comprising a source of wave energy associated with said second body projecting wave energy toward said first body, a pair of reception devices associated with said second body directed toward said first body for receiving corresponding echoes of the wave energy projected by said source and having a known mutual separation measured in said transverse direction, correlating means sensitive to modification of said projected wave energy in the echo process coupled to said reception devices for determining the time interval between receipt of correspondingly modified echoes by said respective reception devices, and means dependent upon the quotient of said separation and said time interval for determining said speed of relative motion.

2. In a system for measuring the speed of relative motion between a first body and a second body in a direction generally transverse to a line joining said bodies, said first body subtending an appreciable angle in said transverse direction, the combination comprising a source of wave energy associated with said second body projecting wave energy toward said first body, a pair of reception devices associated with said second body directed toward said first body for receiving corresponding echoes of the wave energy projected by said source, said reception devices having a known mutual separation measured in said transverse direction, correlating means coupled to said receiving antennas for sensing correspondence between correspondingly modified echoes received at said respective receiving antennas, said correlating means including time delay means coupled to at least one of said reception devices for providing a known time delay of one echo return relative to the other, and means dependent upon the quotient of said separation and said time delay for determining said speed of relative motion.

3. In a system for measuring the speed of motion of a first body relative to the earth, the combination comprising a source of wave energy associated with said first body projecting wave energy downwardly, a pair of reception devices associated with said first body and downwardly directed for receiving corresponding echoes of the wave energy projected by said source, said reception devices having a known mutual separation measured in a horizontal direction, correlating means sensitive to modification of said projected wave energy in the echo process coupled to said reception devices for determining the time interval between receipt of correspondingly modified echoes by said respective reception devices, and means dependent upon the quotient of said separation and said time interval for determining said speed of relative motion.

4. In a system for measuring the speed of motion of a first body in a given horizontal direction relative to the earth, the combination comprising a source of single-frequency constant-amplitude wave energy associated with said first body and projecting wave energy downwardly over a relatively broad beam, a pair of reception devices associated with said first body and downwardly directed for receiving corresponding echoes of the wave energy projected by said source, said reception devices having a known mutual separation measured in a horizontal direction, correlating means sensitive to modification of said projected wave energy in the echo process coupled to said reception devices for determining the time interval between receipt of correspondingly modified echoes by said respective reception devices, and means dependent upon the quotient of said separation and said time interval for determining said speed.

5. In a system for measuring the speed of motion of a body in a given horizontal direction, the combination comprising a source of single-frequency constant-amplitude wave energy associated with said body and projecting wave energy downwardly over a relatively broad beam, a pair of receiving antennas associated with said body and downwardly directed for receiving corresponding echoes of the wave energy projected by said source, said receiving antennas having a known mutual separation measured in said horizontal direction, a pair of detectors coupled to said respective receiving antennas for sensing modification of said projected wave energy in the echo process, time delay means coupled to at least one of said detectors for providing a known time delay to one detected echo return relative to the other, correspondence sensing means having supplied thereto said relatively delayed detected echo returns, means for adjusting the amount of said separation to bring about correspondence, and means dependent upon the quotient of said separation and said time delay for determining said speed.

6. The combination set forth in claim 5 wherein said correspondence sensing means comprises a subtractor and a null detector coupled to said subtractor.

7. The combination set forth in claim 5 wherein said correspondence sensing means comprises a multiplier and a maximum indicating device coupled thereto.

8. The combination set forth in claim 5 wherein said detectors are amplitude modulation detectors, wherein said source transmits energy intermittently, and wherein means are provided for disabling operation of said correspondence sensing means during transmission periods, thereby to avoid the harmful effect of direct leakage of energy from said source to said receiving antennas.

9. In a system for measuring the speed of relative motion between a first body and a second body in a direction generally transverse to a line joining said bodies, said first body subtending an appreciable angle in said transverse direction, the combination comprising a source of single-frequency constant-amplitude wave energy associated with said second body and projecting wave energy toward said first body over a relatively broad beam, a pair of receiving antennas associated with said second body and downwardly directed for receiving corresponding echoes of the wave energy projecting by said source, said receiving antennas having a known mutual separation measured in said transverse direction, a pair of detectors coupled to said respective receiving antennas for sensing modification of said projected wave energy in the echo process, time delay means coupled to at least one of said detectors for providing a known time delay of one detected echo return relative to the other, correspondence sensing means having supplied thereto said relatively delayed detected echo returns, means for adjusting the amount of time delay to bring about correspondence, and means dependent upon the quotient of said separation and said time delay for determining said speed.

10. The combination set forth in claim 9 wherein said correspondence sensing means comprises a subtractor and a null detector coupled to said subtractor.

11. The combination set forth in claim 9 wherein said correspondence sensing means comprises a multiplier and a maximum indicating device coupled thereto.

12. The combination set forth in claim 9 wherein said detectors are amplitude modulation detectors, wherein said source transmits energy intermittently, and wherein means are provided for disabling operation of said correspondence sensing means during transmission periods, thereby to avoid the harmful effect of direct leakage of energy from said source to said receiving antennas.

13. The combination set forth in claim 9 wherein said time delay means comprises a magnetic recording device having spaced recording and play-back devices cooperating with a common magnetic medium.

14. The combination set forth in claim 9 wherein said time delay means comprises a magnetic recording device having spaced recording and play-back devices cooperating with a common magnetic medium and having means for adjusting the rate of advance of said magnetic medium between said last named devices.

15. In a system for measuring the speed of relative motion between a first body and a second body in a direction generally transverse to a line joining said bodies, said first body subtending an appreciable angle in said transverse direction, the combination comprising a transmitter of single-frequency constant-amplitude wave energy associated with said second body and projecting wave energy toward said first body over a relatively broad beam, a pair of antennas associated with said second body and downwardly directed for receiving corresponding echoes of the wave energy projected by said transmitter, said receiving antennas having a known mutual separation measured in said transverse direction, a pair of synchronous detectors coupled to said respective receiving antennas for sensing modification of said projected wave energy in the echo process, means coupled between said transmitter and one of said detectors for supplying to said one detector a wave reduced in frequency by a predetermined amount, means coupled between said transmitter and the other of said detectors for supplying to said other detector a wave increased in frequency by said amount, time delay means coupled to at least one of said detectors for providing a known time delay to one detected echo return relative to the other, means for multiplying said echo returns together, bandpass filter means coupled to the output of said multiplier tuned to a frequency equal to twice said above mentioned amount for selecting the product term in the output of said multiplier, means responsive to the amplitude of said selected term for indicating correspondence, and means dependent upon the quotient of said separation and said time delay at correspondence for determining said speed.

16. The combination set forth in claim 15 wherein a high pass filter is coupled between the outputs of each of said synchronous detectors and the respective input connections to said multiplying means for eliminating waves at frequencies on the order of said predetermined amount.

17. In a system for measuring the speed of motion of a body in a given horizontal direction, the combination comprising a source of single-frequency constant-amplitude wave energy associated with said body and projecting wave energy downwardly in a relatively broad beam, first, second and third receiving antennas associated with said body and downwardly directed for receiving corresponding echoes of the wave energy projected by said source, said receiving antennas each having known mutual separations measured in said horizontal direction, a first detector coupled alternately between said first and second receiving antennas and a second detector coupled to said third receiving antenna, said detectors sensing modification of said projected wave energy in the echo process, time delay means coupled to at least one of said detector outputs for providing a known time delay to one detected output relative to the other detected output, correspondence sensing means having supplied thereto said relatively delayed detected outputs producing alternately a first correlation voltage indicative of correspondence between said first antenna and said third antenna and correspondence between said second antenna and said third antenna, voltage sensitive means responsive to non-equality in said correlation voltages for altering the amount of said time delay to bring about equal correlation voltages, and means dependent upon the quotient of the average separation of said first and second receiving antennas from said third receiving antennas for determining said speed.

18. The combination set forth in claim 17 wherein said detectors are synchronous detectors supplied respectively by waves of a first frequency separation from the frequency of said source, respectively above and below said source frequency, and wherein said rate of alternately coupling said first detector to said first and second receiving antennas is a small fraction of said frequency separation.

19. In a system for measuring the speed of motion of a body in a given horizontal direction, the combination comprising a source of single-frequency constant-amplitude wave energy associated with said body and projecting wave energy downwardly in a relatively broad beam, first, second and third receiving antennas associated with said body and downwardly directed for receiving corresponding echoes of the wave energy projected by said source, said receiving antennas each having known mutual separations measured in said horizontal direction, a first detector coupled alternately between said first and second receiving antennas and a second detector coupled to said third receiving antenna, said detectors sensing modification of said projected wave energy in the echo process, time delay means coupled to at least one of said detector outputs for providing a known time delay to one detected output relative to the other detected output, correspondence sensing means having supplied thereto said relatively delayed detected outputs producing alternately a first correlation voltage indicative of correspondence between said first antenna and said third antenna and correspondence between said second antenna and said third antenna, voltage sensitive means responsive to non-equality in said correlation voltages for altering the spatial separation of said third antenna relative to said first and second antennas to bring about equal correlation voltages, and means dependent upon the quotient of the average separation of said first and second receiving antennas from said third receiving antennas for determining said speed.

20. The combination set forth in claim 19 wherein said detectors are synchronous detectors supplied respectively by waves of a first frequency separation from the frequency of said source, respectively above and below said source frequency, and wherein said rate of alternately coupling said first detector to said first and second receiving antennas is a small fraction of said frequency separation.

21. In a system for measuring the speed of motion of a body in a given horizontal direction, the combination comprising a source of single-frequency constant-amplitude wave energy associated with said body and projecting wave energy downwardly in a relatively broad beam, first, second and third receiving antennas associated with said body and downwardly directed for receiving corresponding echoes of the wave energy projected by said source, said first and second receiving antennas and said first and third receiving antennas having equal mutual separations measured in said horizontal direction, said second and third receiving antennas being adjacent one another and movably supported for translation relative to said first antenna in a horizontal direction transverse to said first horizontal direction, a first detector coupled to said first receiving antenna and a second detector coupled alternatively to said second and third receiving antennas, said detectors sensing modification of said projected wave energy resulting from the echo process, time delay means coupled to at least one of said detector outputs for providing a known time delay to one detected output relative to the other detected output, correspondence sensing means having supplied thereto said relatively delayed detected outputs producing alternately a first correlation voltage indicative of correspondence between said first antenna and said second antenna and correspondence between said first antenna and said third antenna, voltage sensitive means responsive to non-equality in said correlation voltages for translating said second and third antennas in said transverse horizontal direction to bring about equal correlation voltages and thereby provides an indication of drift, and means dependent upon the quotient of the separation of said first antenna from said second and third antennas for determining said speed.

22. The combination set forth in claim 21 wherein said detectors are synchronous detectors supplied respectively by waves of a first frequency separation from the frequency of said source, respectively above and below said source frequency, and wherein said rate of alternately coupling said second detector alternately to said second and third receiving antennas is a small fraction of said frequency separation.

23. The combination set forth in claim 21 wherein all of said receiving antennas are supported upon a single platform which platform is rotatable about a vertical axis.

24. In a system for measuring the speed of motion of a body in a given horizontal direction, the combination comprising a source of single-frequency constant-amplitude wave energy associated with said body and projecting wave energy downwardly in a relatively broad beam, first, second, third and fourth receiving antennas associated with said body and downwardly directed for receiving corresponding echoes of the wave energy projected by said source, said first and second receiving antennas being arranged along a line transverse to a line along which said third and fourth receiving antennas are arranged, said first and second receiving antennas each having known mutual separations from one another and the line along which said third and fourth antennas are arranged, said separations being measured in said horizontal direction, a first detector coupled alternately between said first and second receiving antennas, said third and fourth receiving antennas being adjacent one another and movably supported for translation relative to said first and second antennas in a horizontal direction transverse to said first horizontal direction, a second detector coupled alternately to said third and fourth receiving antennas, said detectors sensing modification of said projected wave energy resulting from the echo process, time delay means coupled to at least one of said detector outputs for providing a known time delay to one detected output relative to the other detected output, means for causing the periods of connection of said first detector and of said second detector to be of equal duration and relatively phased by one half the duration of one of said periods, correspondence sensing means having supplied thereto said relatively delayed detected outputs producing a combination of correlation voltages, the first of which is alternately indicative of correspondence at the momentary spatial separation between said first and second antennas alternately and the line along which said third and fourth antennas are arranged, and the second of which is alternately indicative of correspondence, at the momentary orientation, between the said first two antennas and alternately said third and fourth antennas, a first synchronous detector phased with the switching rate of said first detector for separately deriving said first correlation voltage, voltage responsive means coupled to the output of said first synchronous detector responsive to non-equality of the alternate parts of said first correlation voltage for altering the amount of said time delay to bring about equal correlation voltages, a second synchronous detector phased with the switching of said second detector for separately deriving said second correlation voltage, second voltage responsive means coupled to the output of said second synchronous detector responsive to non-equality in the alternate parts of said second correlation voltage for translating said third and fourth antennas in said transverse horizontal direction to bring about equal correlation voltages and thereby provide an indication of drift, and means dependent upon the quotient of the average separation of said first two antennas from the line along which said third and fourth antennas are arranged for determining said speed.

25. The combination set forth in claim 24 wherein said first and second detectors are synchronous detector supplied respectively by waves of a first frequency separation from the frequency of said source, respectively above and below said source frequency, and wherein said rate of alternately coupling said first detector alternately to said first and second receiving antennas and said rate of alternately coupling said second detector alternately to said third and fourth receiving antennas is a small fraction of said frequency separation.

26. The combination set forth in claim 24 wherein all of said receiving antennas are supported upon a single platform, which platform is rotatable about a vertical axis.

27. In a system responsive to the speed of relative motion between a first body and a second body in a direction generally transverse to a line joining said bodies, said first body subtending an appreciable angle in said transverse direction, the combination comprising a source of wave energy associated with said second body projecting wave energy toward said first body, a pair of reception devices associated with said second body directed toward said first body for receiving corresponding echoes of the wave energy projected by said source and having a known mutual separation measured in said transverse direction, and correlating means sensitive to modification of said projected wave in the echo process coupled to said reception devices for determining the time interval between receipt of correspondingly modified echoes by said respective reception devices.

28. In a system responsive to the speed of relative motion between a first body and a second body in a direction generally transverse to a line joining said bodies, said first body subtending an appreciable angle in said transverse direction, the combination comprising a source of wave energy associated with said second body projecting wave energy toward said first body, a pair of reception devices associated with said second body directed toward said first body for receiving corresponding echoes of the wave energy projected by said source, said reception devices having a known mutual separation measured in said transverse direction, and correlating means coupled to said receiving antennas for sensing correspondence between correspondingly modified echoes received at said respective receiving antennas, said correlating means including time delay means coupled to at least one of said reception devices for providing a known time delay of one echo return relative to the other.

References Cited in the file of this patent
UNITED STATES PATENTS

| | | |
|---|---|---|
| 2,166,991 | Guanella | July 25, 1939 |
| 2,866,373 | Doyle | Dec. 30, 1958 |
| 2,967,449 | Weiss | Jan. 10, 1961 |
| 3,004,219 | Albert | Oct. 10, 1961 |